United States Patent

Pratt et al.

Patent Number: 5,814,722
Date of Patent: Sep. 29, 1998

[54] SYSTEM FOR MEASUREMENT OF PEAKS ON SURFACES

[75] Inventors: Steven M. Pratt, Hilton; Edwin R. Olear, Hamlin, both of N.Y.

[73] Assignee: Eastman Kodak Company, Rochester, N.Y.

[21] Appl. No.: 783,925

[22] Filed: Jan. 17, 1997

[51] Int. Cl.⁶ ........................................ G01B 7/34
[52] U.S. Cl. ............................................. 73/105
[58] Field of Search ................... 73/105; 250/306, 250/307; 33/556, 558

[56] References Cited

U.S. PATENT DOCUMENTS

| | | | |
|---|---|---|---|
| 3,112,642 | 12/1963 | Harmon et al. | 73/105 |
| 3,372,578 | 3/1968 | Harmon | 73/105 |
| 3,544,774 | 12/1970 | Peklenik | 235/151 |
| 3,847,730 | 11/1974 | Doering | 162/198 |
| 4,084,324 | 4/1978 | Whitehouse | 33/174 L |
| 4,951,497 | 8/1990 | Gilibert | 73/105 |
| 5,242,831 | 9/1993 | Oki | 436/5 |

*Primary Examiner*—Robert Raevis
*Attorney, Agent, or Firm*—Arthur H. Rosenstein

[57] ABSTRACT

A method of characterizing the roughness of a surface comprises counting peaks on a surface using a sensor by locating direction changes above a minimum and searches for the next direction change and where three changes are found of a valley, peak and another valley, one peak is counted. A signal qualifies as a peak if its short leg is above the normal threshold.

2 Claims, 3 Drawing Sheets

SYSTEM FOR MEASUREMENT OF PEAKS ON SURFACES

FIELD OF THE INVENTION

This invention relates to the measurement of surfaces and coatings wherein parts of the surface or coating protrude above the general topography. The size and number of peaks on the surface are counted to determine the contribution to the over all surface roughness.

BACKGROUND OF THE INVENTION

Surface Metrology is measurement technology which deals with the characterization and quantification of surface textures and/or features. Most of the statistical parameters used to describe a surface are standard parameters established and standardized by an organization or subcommittee such as ASME-B46.

This system relates to the measurement of surface features protruding above the general topography which includes peak counting (Pc) and height measurements.

Surface measurement systems are frequently used to quantify the topography (roughness) of various surfaces. These measurements are often made to determine how a part will function. Protruding features (peaks) can determine or control appearance, gloss, friction, wear, release, coatability and contact resistance. Measurements are often made by a sensor and a routine is established to count peaks as shown in FIG. 2.

This routine is designed for random textures and does not work well if features skewed above or below the real surface are to be measured as they may not be counted. It also requires filtering to reduce noise which is time consuming and may cause errors, as seen in FIG. 3. Because the routine depends on a band set equally about the mean line, any waviness in the data will cause errors. If there are only a few small features, the mean line will be very close to the lowest part of the surface. When this happens, the lower level of the band may fall below the surface and the routine fails, as seen in FIG. 4.

The surface metrology field is now focusing more toward three dimensional (3D) surface evaluation. This is an area assessment technique which correlates more with functionality (lubrication, abrasion resistance, conveyance etc.) and appearance or cosmetics of a surface (gloss, haze, clarity, etc.). It is important to count all true physical surface features in order to have direct correlation with the characteristics described above.

Metrology technology was developed with manufacturing and finishing processes in mind and still concentrates on designing equipment and developing parameters which will be used in the manufacturing environment. Our meteorology group has taken this science and applied it to the non-traditional surfaces that are found on Kodak film and paper products to name a few. In applying some of the canned parameters we realized that one parameter in particular, peak counting is very important to describing film and other matte or particulate surfaces. Commercial instruments utilize a peak counting routine which is useful in characterizing peaks or peak like features that result from a finishing or machining operation such as grinding or turning. This peak counting method establishes a band (threshold) about the mean line in which qualifying peaks must exceed. This method for counting peaks does not adequately describe or reflect true peak count on particulate/matte type samples.

In U.S. Pat. No. 3,544,774 a surface roughness peak counting method involves a slope dispersal parameter to accommodate uniform distributions of surface undulations (col. 1, lines 17–20 and col. 2, line 4).

U.S. Pat. No. 3,847,730 discloses a surface maximum peak responsive system for monitoring and controlling the manufacture of sheet paper products.

The problem of these counting methods is that this routine does not take into account the fact that particles don't always disburse and settle on a surface in a uniform manner, particulates may skew to the normal surface and may not have uniform height at the surface. Particles can also clump on the surface or may be added to compound surfaces which display more than one type of roughness or peak. These schemes need a filtered profile to work. They do not act like a floating window which follows the surface whether it is flat or wavy. Other peak counting parameters require filtering and in many cases the wrong filter is chosen or the filtering changes the surface in a negative way.

Progress in the surface metrology field is now focusing more toward three dimensional (3D) surface evaluation. This is an area assessment technique which correlates more with the functionality (lubrication, abrasion resistance, conveyance, etc.) and appearance or cosmetics of a surface (gloss, haze, clarity, etc.). It is important to count all true physical surface features in order to have direct correlation with the characteristics described above.

In addition, U.S. Pat. Nos. 4,084,324 discloses a measuring instrument, 4,349,880 describes an inspection system for detecting defects in regular patterns. U.S. Pat. No. 4,951,497 shows a process for measuring the roughness of a surface and U.S. Pat. No. 5,242,831 describes a method for evaluating roughness on a silicone substrate surface.

Thus far, no truly reliable method for measuring and counting peaks to characterize surface roughness has been available.

SUMMARY OF THE INVENTION

The problems of insufficient characterization of sample surfaces has been overcome by a system comprised of using a contact sensor linked to a computer using a short leg peak counting method.

The short leg peak counting scheme permits a full peak counting matrix, regardless of mean line or thresholds. The only qualifiers for this peak counting method is that the shorter of the two legs must be equal to or greater than the minimum setting (Z height) in order to qualify as a peak.

The minimum setting is usually set just above the inherent noise of the instrument and/or amplification being used for surface data acquisition. This discards peaks which may be within a particular noise band.

For a better understanding of the present invention, together with other and further objects, advantages and capabilities thereof, reference is made to the following detailed description and appended claims in connection with the preceding drawings and description of some aspects of the invention.

DETAILED DESCRIPTION OF THE PREFERRED EMBODIMENTS

Figure 1:
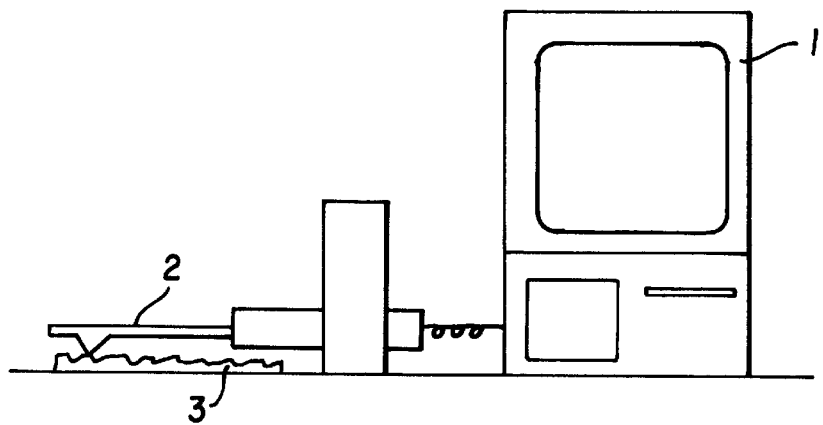
FIG. 1 is a schematic of apparatus useful in practicing the method of the present invention.

The method of counting peaks on a substrate can be used in conjunction with apparatus as depicted in FIG. 1. In FIG. 1, a substrate or sample 3 is placed under a contact stylus 2 and the graph is drawn of the peaks on the substrate by a computer 1.

The substrate or sample can be any material for which a measurement of the roughness is desired. Examples are photographic film, X-ray film, graphic arts film paper, rollers and the like.

The substrate is placed under the contact stylus which can be an induction type sensor or it could be optical focusing. The stylus reports the signal indicating the roughness of the surface by registering peaks to the computer.

The computer can be any type of information gathering instrument to assimilate the peaks and count them according to the present invention.

Figure 2:
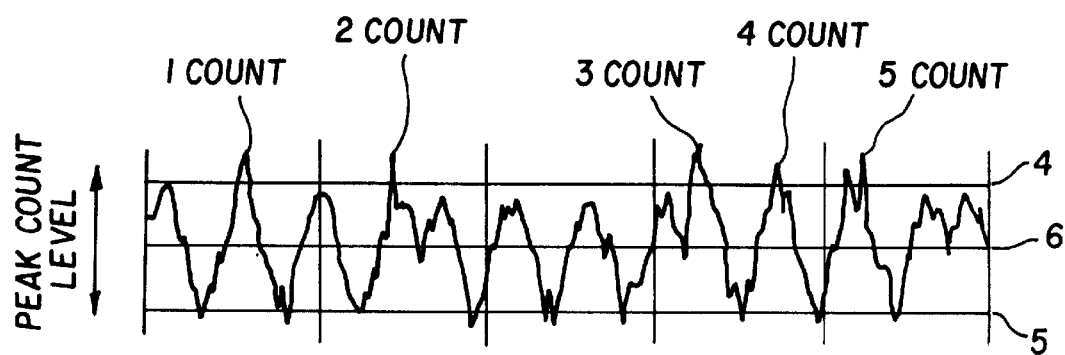
FIG. 2 is a depiction of a prior art peak counting method.

FIG. 2 illustrates a prior art method of counting peaks using this type of equipment. As can be seen from FIG. 2, the peaks are counted using an upper boundary line 4, a lower boundary line 5 and a medium 6. The counting is done by amplitude band.

Figure 3A:
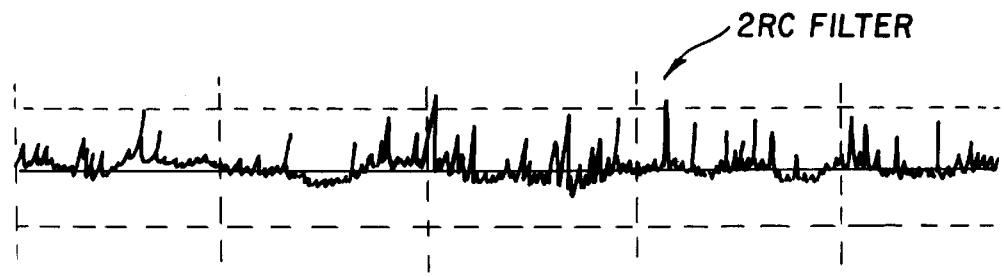
FIGS. 3a) to d) are depictions of prior art peak counting methods.
Figure 3B:
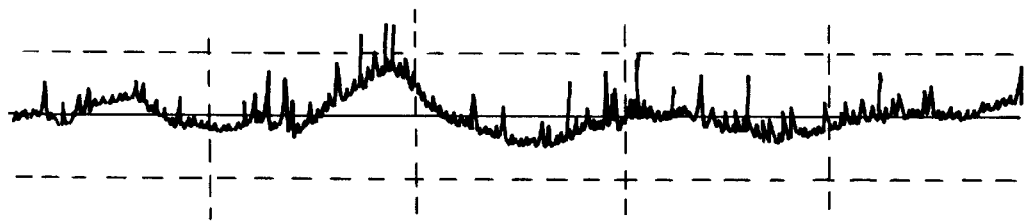
Figure 3C:
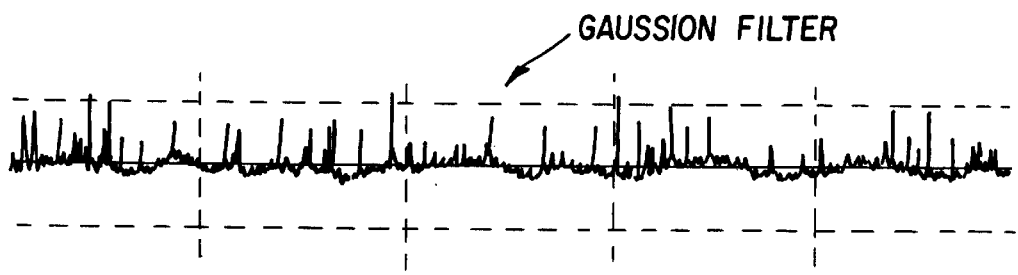
Figure 3D:
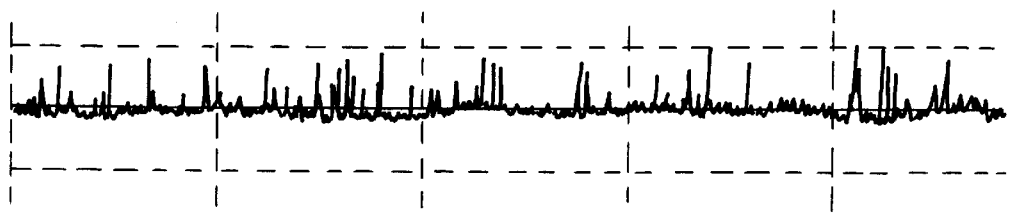

The problems of this prior art method of counting peaks is seen by the graphs of a substrate using a 2RC filter in FIG. 3 and FIG. 3a using a Gaussion filter. The errors occur when wave forms exceed the amplitude band.

Figure 4:
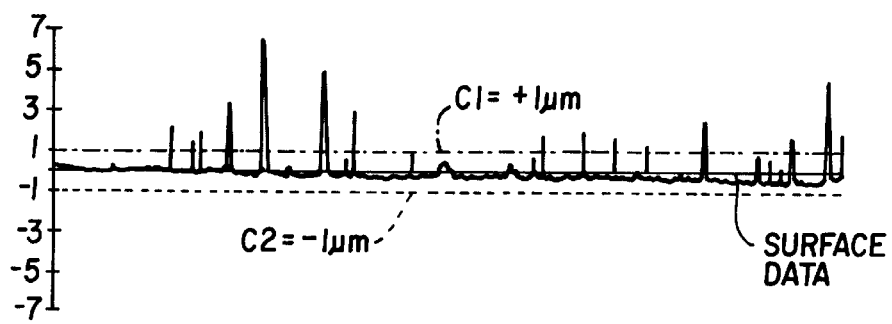
FIG. 4 is a peak chart of the prior art.

FIG. 4 shows the problems of using the prior art method of peak counting where the lower level of the band falls below the surface. This results in a failure to count peaks. This only works with very small amplitude bands.

when three changes are found, a valley, a peak and a valley, one peak is counted. The height of the longer of the two sides is recorded as the height of the peak. This examination is repeated along the entire set of data (surface profile). Peak counts are then reported in the number of peaks per unit length, peaks per inch or centimeter. This method of measurement offers several advantages. It is faster because filtering the data is not required. Selecting the wrong filtering length is also eliminated. Not using a filter prevents false data being created by the filter. If wave forms cause the data to fall below the mean line, peaks will still be counted using the short leg routine. This makes the measurements more accurate and repeatable. It is noted that the standard peak counting method measures no peaks greater than 0.6 microns however the short leg method counts up to 54 peaks greater than 1.0 micron. Of course these larger peaks will have a great influence on how the surface functions.

Figure 5:
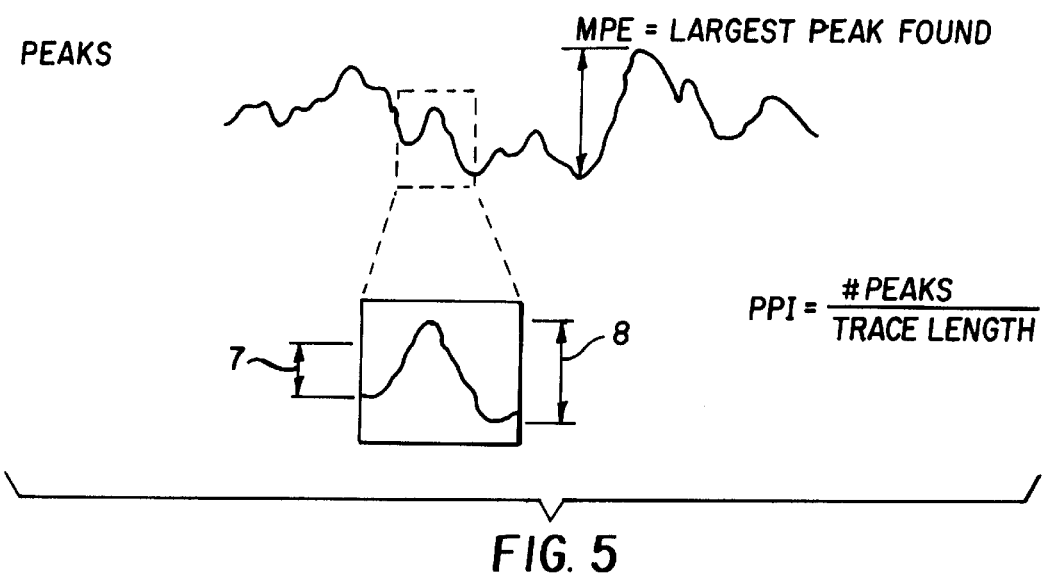
FIG. 5 depicts the short leg peak counting method of the instant invention.

As depicted in FIG. 5, the SLPC method involves a floating threshold window to locate qualifying peaks.

In this method, the minimum peak size (threshold limit) is compared to the shorter leg of the peak to see if it qualifies. The longer leg is reported by its peak height as seen in FIG. 5. The short leg size 7 is compared to the peak height 8. The threshold limit (not shown) is a function of magnification and background noise. Background noise is figured by static noise of the instruments and the minimum peak is set just above background or static noise.

The efficiency of the short leg counting system was tested versus a standard counting method.

The standard counting method consisted of amplitude band counting while the short leg counting system consisted of floating threshold window counting.

The results are shown below in Table 1.

TABLE 1

Short Leg Peak Counting (SLPC)
Various Standard Counting Test Sample

| Minimum Peak Height ($\mu$m) | Standard Counting (PPCM)* 1a | Short Leg Counting (PPCM) 2a | Standard (Std. Dev.) 1b | Short Leg (Std. Dev.) 2b |
|---|---|---|---|---|
| 0.08 | 346.4 | 449.9 | 30.4 | 22.3 |
| 0.12 | 254.0 | 306.8 | 33.3 | 16.5 |
| 0.25 | 30.7 | 159.4 | 17.8 | 18.3 |
| 0.50 | 0.1 | 63.3 | 0.6 | 15.3 |
| 1.00 | 0.0 | 9.3 | 0.0 | 4.4 |
| 1.50 | 0.0 | 1.1 | 0.0 | 2.1 |

| Test Sample Minimum Peak Height ($\mu$m) | Standard Counting (PPCM) | Short Leg Counting (PPCM) | Standard (Std. Dev.) | Short Leg (Std. Dev.) |
|---|---|---|---|---|
| 0.08 | 719.4 | 1009.2 | 19.7 | 29.9 |
| 0.12 | 668.7 | 876.6 | 17.5 | 30.2 |
| 0.25 | 509.9 | 610.8 | 22.0 | 24.6 |
| 0.50 | 56.4 | 286.0 | 21.2 | 21.4 |
| 1.00 | 0.0 | 54.1 | 0.0 | 13.1 |
| 1.50 | 0.0 | 9.9 | 0.0 | 5.2 |

*(PPCM) peaks per centimeter. Results may be given in peaks per centimeter or peaks per inch. The minimum peak height is identified in the first column and is determined by establishing the noise level and using any level at or above the threshold limit.

This routine examines the data looking for a change in direction. When a direction change is located the size of that change is compared to minimum size (threshold). If the change is greater than the minimum, one side of a peak is located. The routine then searches for the next changes in direction and compares this to the minimum. For example, Peak counts are single values computed from the data obtained in a sample. Peak counts provide the best guess of a population characteristic based on the available data. The table shows some of the most commonly used sample estimates. The formulas for averages and standard deviations are available on many hand calculators and all statistical software packages.

| Sample Point Estimate | Population Characteristic Estimated | Symbol and Formula |
|---|---|---|
| Sample Average | Population Average, $\mu$ (indicates the center of the data) | $\bar{\chi} = \dfrac{\sum_{i=1}^{n} \chi i}{n}$ |
| Sample Standard Deviation | Population Standard Deviation, $\sigma$ (measures variability) | $s = \sqrt{\dfrac{\sum_{i=1}^{n}(x_i - \bar{x})^2}{n-1}}$ |
| Difference of Sample Averages | Difference of Population Averages, $\mu_1 - \mu_2$ | $\bar{x_1} - \bar{x_2}$ |

The sample average, x, is the sum of the observed data values divided by the total number of data values. Every observation in the data contributes to the estimate of the average. A bad data value will influence the sample estimate; a low value lowers the estimated average, a high value raises the estimated average.

The formula for the sample standard deviation includes adding up the squared differences of each data value from the sample average. Because the differences are squared, values far from the average contribute alot to the standard deviation estimate. Therefore, samples with many values far from the sample average will have a large standard deviation, while a sample with most values close to the sample average will have a small standard deviation. In this way, the sample standard deviation indicates the amount of variability in the sample.

The average and the standard deviation are in the same units as the original measurements. Sometimes $s^2$ (the squared value of the sample standard deviation) is used in calculations. This is called the "sample variance".

FIG. 1 shows a type of device to collect and analyze information using the SLPC method.

While the invention has been described with particular reference to a preferred embodiment, it will be understood by those skilled in the art the various changes can be made and equivalents may be substituted for elements of the preferred embodiment without departing from the scope of the invention. In addition, many modifications may be made to adapt a particular situation in material to a teaching of the invention without departing from the essential teachings of the present invention.

We claim:

1. A method of determining the characteristics of a surface of a material comprising sensing peaks in said surface and counting peaks wherein the short leg is above the height of a threshold window wherein when a direction change in amplitude is located, the size of the change is compared to the threshold and when these changes locate a peak leg, a valley and a peak leg, one peak is counted and the height of the larger of the two legs is recorded and this process is repeated along the entire set of data.

2. The method of claim 1 wherein the total number of peaks per unit length is determined.

* * * * *